June 3, 1958 J. MAZZARINS 2,837,380
TRACK RECOIL MECHANISM
Filed Aug. 31, 1956

INVENTOR.
Janis Mazzarins
BY
R. P. Barnard
ATTORNEY

United States Patent Office 2,837,380
Patented June 3, 1958

2,837,380
TRACK RECOIL MECHANISM

Janis Mazzarins, Cleveland, Ohio, assignor to General Motors Corporation, Detroit, Mich., a corporation of Delaware Application August 31, 1956, Serial No. 607,447

9 Claims. (Cl. 305—9)

This invention relates to track adjusting mechanisms and, in particular, to a self-contained track recoil and adjusting mechanism for track-laying vehicles.

Mechanical devices for maintaining endless tracks of track-laying vehicles under desired tension are well known in the prior art. In a typical installation one or more heavy coil springs are disposed to yieldably urge the track idler wheel forwardly against a fixed stop. The fixed stop is usually adjustable fore and aft to take up initial slack in the track linkage and provide for periodical readjustment necessitated by graduated wear of the track links and pins. When rocks or other obstructions become lodged between the tracks and idler wheels or drive sprockets, the idler wheel moves rearwardly against the pressure of the coil spring until the obstruction has been dislodged and thereupon returns forwardly in response to spring pressure until arrested by the fixed stop.

While this type of adjusting and recoil mechanism is adequate under initial conditions of operations, numerous problems arise in connection therewith, among which is the difficulty encountered in making periodical adjustments to take up track slack resulting from normal wear of the track linkage. Under field conditions accumulation of rust, dirt, ice and other materials often make it extremely difficult to reset the fixed mechanical stops. Similarly, field disassembly of the mechanism presents considerable danger because of the high spring preload necessary to provide sufficient resistance to recoil. Furthermore, a particular spring selected for use with a new track loses to some degree its effectiveness in recoil and in adjusting the endless track tension upon the occurrence of track wear; if a different spring characteristic is desired, it is necessary to replace the spring.

It is desirable, therefore, to have a track recoil and adjusting mechanism of greater versatility than heretofore available, while permitting ready installation in a minimum of space on a crawler tractor or similar vehicle, and one which may be readily adjusted without additional equipment to compensate for conditions frequently arising in field operations.

It is, therefore, an object of this invention to provide a self-contained track tension adjusting mechanism employing yieldable and non-yieldable fluid pressures within a common cylinder which will eliminate the need for cumbersome, space-consuming elements such as pumps, valves and fluid lines.

It is another object of this invention to provide a self-contained track recoil and adjusting mechanism wherein compressible fluid pressure contained within an accumulator chamber within the recoil cylinder constantly, yieldably urges forwardly an idler wheel over which an endless track is entrained, the forward movement of the idler wheel being limited by an incompressible fluid contained in a stop chamber formed entirely within said cylinder.

Still another object of this invention is to provide a self-contained track slack adjusting and recoil mechanism in which the quantities of compressible and incompressible fluids contained, respectively, within the accumulator and stop chambers of the recoil cylinder are easily variable to permit adjustment of track tension in the field to accommodate changing conditions of track wear.

It is a further object of this invention to provide a self-contained track recoil and adjusting mechanism comprising a track recoil cylinder having an accumulator chamber filled with nitrogen or other compressible fluid constantly, yieldably urging forwardly a piston slidably disposed within said cylinder and operatively connected to a front idler wheel, and a grease-containing chamber on the opposite side of the piston from the accumulator chamber forming an adjustable abutment limiting forward movement of the piston and idler wheel.

A further object of the invention is to provide a self-contained track recoil and adjusting mechanism in which the pressures of the fluids contained in the accumulator and stop chambers on either side of the piston are equal when the mechanism is not recoiling, thereby reducing leakage and providing better lubrication.

These and other objects and advantages of the invention will become more fully apparent as reference is had to the accompanying specification and drawing wherein.

As the description of the invention proceeds, like numerals are employed to designate corresponding parts in the various figures of the drawing.

Figure 1:
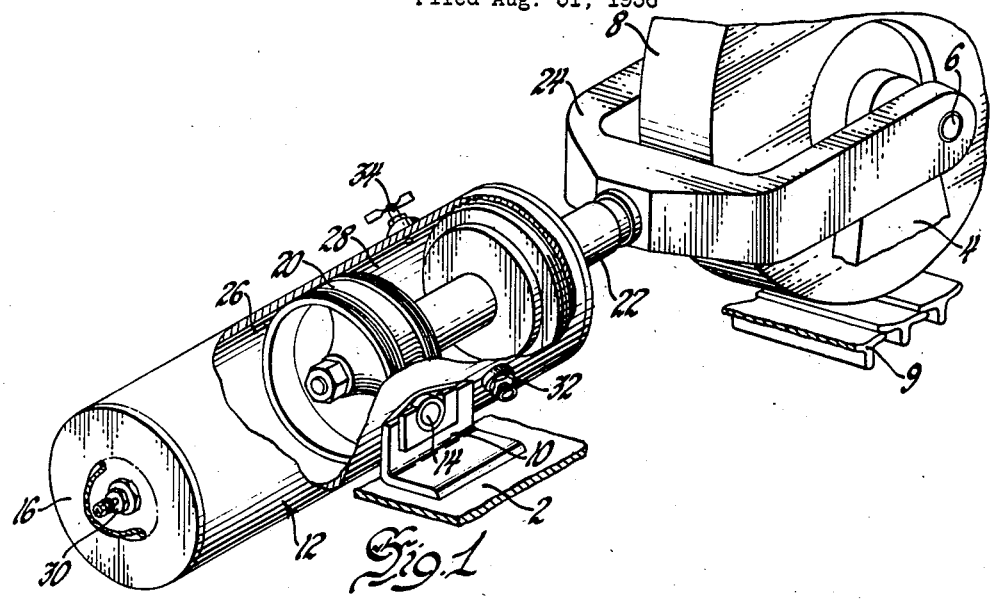
Figure 1 is a fragmentary perspective view, partly in section, of one embodiment of the self-contained track recoil and adjusting mechanism adapted to a crawler tractor.
Figure 2:
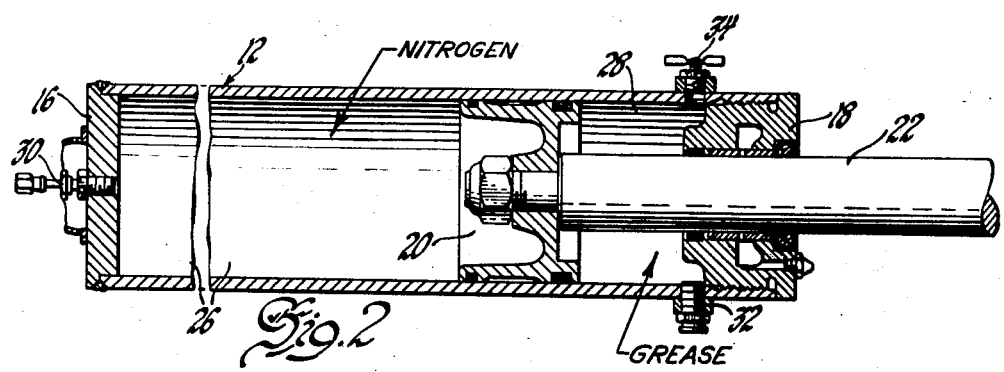
Figure 2 is a longitudinal cross-sectional view of the self-contained track recoil and adjusting mechanism shown in Figure 1.

Referring now to the drawing, and particularly Figures 1 and 2, there is illustrated a portion of a crawler track frame 2 upon which is slidably mounted an idler wheel carrier 4. Rotatably mounted on carrier 4 by pivot shaft 6 is an idler wheel 8 around which there is entrained an endless flexible track 9. Spaced rearwardly of wheel 8 are a pair of laterally spaced upstanding brackets 10 welded or otherwise suitably secured to the track roller frame 2. A track recoil and adjusting cylinder 12 is pivotally mounted between the upstanding brackets 10 by means of the trunnions or heavy pins 14. The rearwardly extending end of the cylinder 12 is closed by a cap 16 welded to the cylinder while the forward end thereof is closed by a cap or collar 18 threadably secured within the forward end of the cylinder.

Slidably disposed within the cylinder 12 is a piston 20 having a piston rod 22 extending forwardly through the cap 18 in sealing engagement therewith and terminating at its forward end in a yoke 24 which mounts the idler wheel 8 for fore and aft sliding movement with the carrier 4 on the track roller frame.

The piston 20 separates the cylinder 12 into two variable volume chambers, an accumulator chamber 26 and a stop chamber 28. The chamber 26 positioned rearwardly of the piston 20 is filled with nitrogen or other suitable compressible fluid to constantly, yieldably urge forwardly the piston 20 and hence the piston rod 22, yoke 24 and idler wheel 8 to tension the endless track. However, the idler wheel may recoil against the accumulator pressure. A suitable valve member 30 is provided to charge and adjust the fluid pressure within the accumulator chamber.

The second variable volume chamber 28 is adapted to be charged through the fitting 32 with a suitable incompressible fluid such as grease to limit the forward movement of the piston 20 and hence track tension. A manually operable petcock 34 controls bleeding of grease from the stop chamber 28.

Initially, the accumulator and stop chambers are charged with their respective fluids at approximately equal pressures thereby minimizing leakage past the seals mounted on the piston. If, while operating in the field, undue track slack occurs due to track pin or link wear or other reason, the vehicle operator may increase track tension by manually operating the petcock 34 to bleed the desired amount of grease or other incompressible fluid from the stop chamber 28; it is not necessary to charge the accumulator chamber to a greater pressure. Therefore, it will be apparent that this construction provides a simple method of increasing track tension in the field without the use of a grease gun or other equipment.

The operation of the embodiment shown in Figures 1 and 2 will be readily apparent. As the vehicle moves over the terrain and as dirt or other material becomes lodged between the endless track and idler wheel, the idler wheel 8 will be moved rearwardly against the yieldable accumulator pressure acting on the rearward face of piston 20. As the mechanism recoils and the foreign material becomes dislodged, the accumulator pressure will thrust the idler wheel forwardly until the forward face of the piston 20 abuts the fluid in the stop chamber 28, at which time the desired track tension is obtained. As aforementioned, if track slack still exists due to track link or pin wear, grease may be bled from the stop chamber through the petcock 34 to permit the piston 20 and idler wheel 8 to ride further forwardly to obtain the desired track tension.

Figure 3:
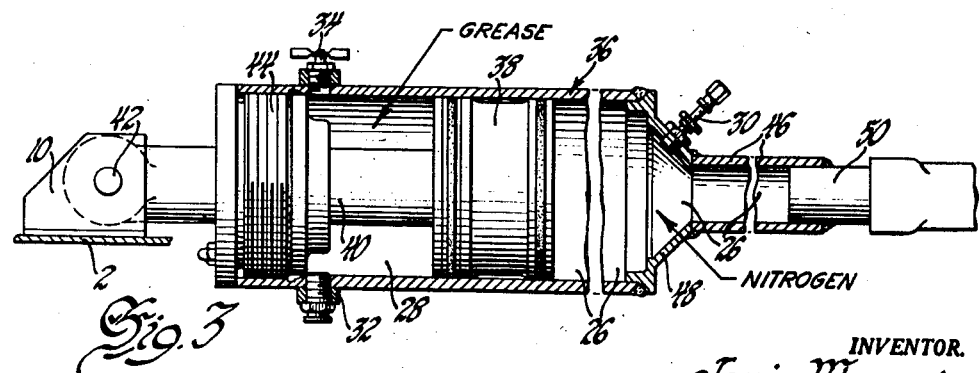
Figure 3 is a longitudinal cross-sectional view of a second embodiment of the track recoil and adjusting mechanism.

Referring now to Figure 3 and a second embodiment of the invention, there is shown a cylinder 36 within which is slidably disposed a piston 38 having a piston rod 40 extending rearwardly therefrom and terminating in a pivotal pinned connection 42 between the laterally spaced upstanding brackets 10 secured to the track roller frame 2. A collar 44 sealingly engages the rearwardly extending piston rod and is threadably secured within the rear end of the cylinder 36. A hollow rod 46 is integrally formed with the cylinder end cap 48 or otherwise suitably secured to the forward end of the cylinder 36 in open communication therewith. The rearwardly extending stub end 50 of the idler wheel mounting yoke is received within the forward end of the hollow rod 46 and fixed therein. The piston 38 separates the cylinder into a variable volume stop chamber 28 supplied with grease through the fitting 32 and from which grease may be bled through the petcock 34. The accumulator chamber 26 includes not only the variable volume within the cylinder forward of the piston face, but also the volume contained within the hollow rod 46.

In operation of the embodiment of Figure 3, the cylinder 36 is recoiled against the yieldable accumulator pressure upon dirt or other material becoming lodged between the idler wheel 8 and endless track 9. Upon removal or dislodgment of the obstruction, the accumulator pressure will thrust the cylinder 36 and yoke rod 50 forwardly until such time as this movement is limited by the incompressible grease in the chamber 28 between the rear face of the piston 38 and the forward face of the collar 44. As conditions require, grease may be bled from the stop chamber 28 to slide the idler wheel 20 forwardly to obtain the desired track tension in the field.

While two embodiments of the invention have been shown and described, it will be apparent that other changes and modifications may be made therein within the scope of the invention. It is, therefore, to be understood that it is not intended to limit the invention to the embodiments shown, but only by the scope of the claims which follow.

I claim:

1. A self-contained track adjusting mechanism for a vehicle having an idler wheel over which there is entrained an endless flexible track, said mechanism being mounted on said vehicle and operatively connected to said idler wheel, said mechanism comprising a closed cylinder, a piston slidably disposed within said cylinder and having a piston rod extending through one end thereof, a stop chamber containing an incompressible fluid surrounding said piston rod to limit relative movement of said piston and cylinder in one direction, a self-contained accumulator chamber opposite said piston from said stop chamber, said accumulator chamber containing yieldable fluid under pressure constantly urging relative movement of said cylinder and said piston in said one direction and permitting relative recoil of said cylinder and piston in the opposite direction.

2. In combination with a vehicle having an idler wheel over which there is entrained an endless track, a self-contained track tension adjusting mechanism pivotally mounted on said vehicle and operatively connected to said idler wheel to adjustably vary the position thereof, said mechanism comprising a closed cylinder, a piston slidably disposed within said cylinder and forming therewith a self-contained accumulator chamber containing a compressible fluid under pressure and a stop chamber containing an incompressible fluid limiting movement of said piston in response to accumulator pressure, and a piston rod extending through said stop chamber and out of one end of said cylinder.

3. A self-contained track adjusting mechanism pivotally connected to a track-laying vehicle and operatively connected with an idler wheel to adjustably vary the position thereof to tension a track entrained thereon comprising, a closed cylinder, a self-contained accumulator chamber and a stop chamber on opposite sides of a piston slidably disposed within said cylinder, a piston rod extending through said stop chamber and one end of said cylinder, said chambers being charged to substantially equal pressures with respectively a yieldable fluid and a non-yieldable fluid when said mechanism is in a substantially static state, said yieldable fluid constantly urging said piston toward said stop chamber, said non-yieldable fluid limiting movement of said piston into said stop chamber.

4. A self-contained track adjusting mechanism comprising a closed cylinder, a piston slidably disposed within said cylinder and forming therewith a self-contained accumulator chamber containing a yieldable pressure fluid urging said piston in one direction and a stop chamber containing an incompressible fluid limiting travel of said piston under accumulator pressure, a piston rod extending through said stop chamber and one end of said cylinder, said mechanism being pivotally mounted on a vehicle track roller frame and forming an extensible and retractable connection between the latter and an idler wheel over which an endless track is entrained.

5. In combination with a vehicle having an idler wheel over which there is entrained an endless flexible track, a self-contained track adjusting mechanism, said mechanism comprising a closed cylinder pivotally mounted on said vehicle, a piston slidably disposed within said cylinder and having a forwardly extending piston rod operatively engaged with said idler wheel, a stop chamber surrounding said piston rod and containing an incompressible fluid limiting forward movement of said piston within said cylinder, and a self-contained accumulator chamber to the rear of said piston containing a compressible fluid under pressure constantly urging said piston forwardly within said cylinder.

6. The track adjusting mechanism defined by claim 5 in which manually actuable valve means is provided to bleed fluid from said stop chamber to adjust forward travel of said piston.

7. In combination with a vehicle having an idler wheel over which there is entrained an endless flexible track, a self-contained track adjusting mechanism, said mechanism comprising a closed cylinder pivotally mounted on said vehicle, a piston slidably disposed within said cylinder and having a forwardly extending piston rod operatively engaged with said idler wheel, a stop chamber within said cylinder forward of said piston containing an incompressible fluid limiting forward movement of said piston within said cylinder, a self-contained accumulator chamber to the rear of said piston within said cylinder containing a compressible fluid under pressure constantly urging said piston forwardly within said cylinder, said accumulator and stop chamber pressures being substantially equal when said mechanism is in a substantially static state whereby leakage between said chambers is minimized.

8. A track adjusting mechanism mounted on a tracklaying vehicle and operatively connected with a track idler wheel carried thereon comprising a closed cylinder, a piston slidably disposed within said cylinder and having a piston rod extending through one end thereof, a stop chamber containing an incompressible fluid surrounding said piston rod to limit relative movement of said piston and cylinder in one direction, a self-contained accumulator chamber opposite said piston from said stop chamber and including a hollow rod portion in open communication therewith, said accumulator chamber and hollow rod containing yieldable fluid under pressure constantly urging relative movement of said cylinder and piston in said one direction and permitting relative recoil of said cylinder and piston in the opposite direction.

9. A self-contained track adjusting mechanism for a vehicle having an idler wheel over which there is entrained an endless flexible track, said mechanism comprising a closed cylinder having a forwardly extending hollow rod portion operatively connected to said idler wheel and in open communication with said cylinder, a piston slidably disposed within said cylinder to the rear of said hollow rod and having a rearwardly extending piston rod pivotally mounted on said vehicle, said cylinder and hollow rod containing a compressible fluid under pressure yieldably urging said cylinder forwardly of said piston, and an incompressible fluid to the rear of said piston and surrounding said piston rod forming an abutment limiting forward movement of said cylinder.

References Cited in the file of this patent

UNITED STATES PATENTS

| | | |
|---|---|---|
| 1,220,630 | Hayes | Mar. 27, 1917 |
| 2,322,977 | Schroder et al. | June 29, 1943 |
| 2,669,972 | Cross | Feb. 23, 1954 |